United States Patent [19]

Kato

[11] Patent Number: 4,769,693

[45] Date of Patent: Sep. 6, 1988

[54] EXPOSURE-CONTROL DEVICE FOR USE IN VIDEO CAMERA

[75] Inventor: Shinichi Kato, Tokyo, Japan

[73] Assignee: Olympus Optical Co., Ltd., Tokyo, Japan

[21] Appl. No.: 936,330

[22] Filed: Dec. 1, 1986

[30] Foreign Application Priority Data

Dec. 13, 1985 [JP] Japan .................................. 60-280503

[51] Int. Cl.$^4$ .............................................. H04N 9/04
[52] U.S. Cl. ........................................ 358/42; 358/98; 358/228
[58] Field of Search ..................... 358/41, 42, 98, 228, 358/213.13

[56] References Cited

U.S. PATENT DOCUMENTS

| | | | |
|---|---|---|---|
| 3,794,408 | 2/1974 | Ian et al. ................ | 358/42 |
| 4,532,918 | 8/1985 | Wheeler ............... | 358/168 |
| 4,546,379 | 10/1985 | Sarofeen et al. ........ | 358/42 |
| 4,622,584 | 11/1986 | Nagasaki et al. ........ | 358/98 |
| 4,638,353 | 1/1987 | Nagasaki et al. ........ | 358/98 |
| 4,653,478 | 3/1987 | Nagasaki et al. ........ | 358/98 X |
| 4,689,689 | 8/1987 | Saito et al. ............ | 358/228 |

FOREIGN PATENT DOCUMENTS

| | | |
|---|---|---|
| 3413146 | 10/1984 | Fed. Rep. of Germany . |
| 3432393 | 4/1985 | Fed. Rep. of Germany . |
| 3432933 | 4/1985 | Fed. Rep. of Germany . |
| 3429789 | 4/1985 | Fed. Rep. of Germany . |

OTHER PUBLICATIONS

Tietze, U.: Schenk, Ch.; Halbleiter–Schaltungstechnik, 5th Edition, Berlin Heidelberg, New York, 1980, pp. 198, 199—ISBN 3-540-09848-8.

Primary Examiner—James J. Groody
Assistant Examiner—E. Anne Faris
Attorney, Agent, or Firm—Frishauf, Holtz, Goodman & Woodward

[57] ABSTRACT

An exposure-control device for use in a video camera comprises an integrator for integrating the image signal intermittently output from the camera, a gate for electrically separating or isolating the integrator from the camera, the gate being made nonconductive while the image signal is not output from the camera, and an exposure-control member for controlling a camera exposure level in accordance with the output from the integrator. Since the integrator is electrically separated from the camera during the periods when the image signal is not output from the camera, the integration value can be held during those periods.

10 Claims, 3 Drawing Sheets

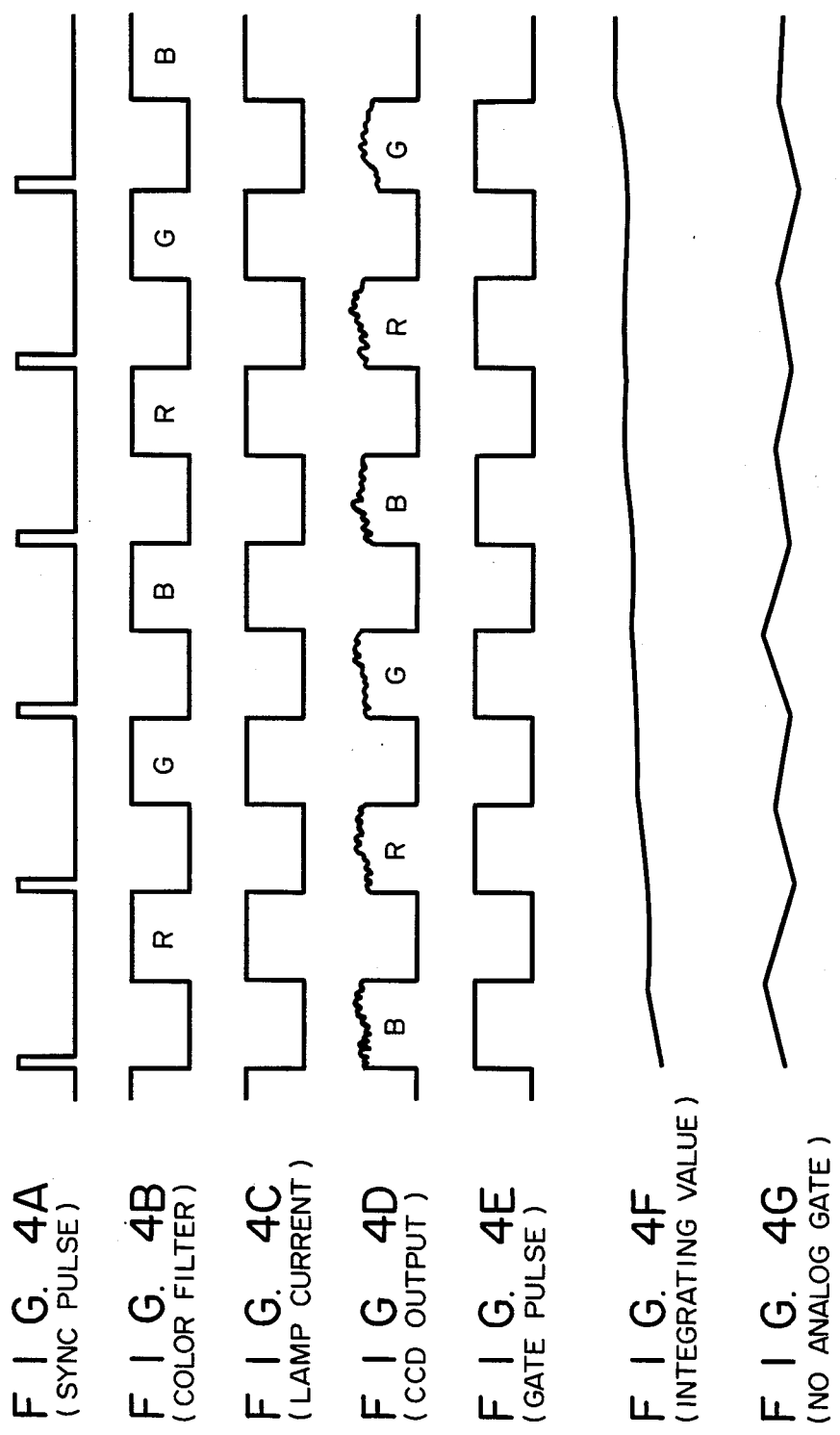

EXPOSURE-CONTROL DEVICE FOR USE IN VIDEO CAMERA

BACKGROUND OF THE INVENTION

This invention relates to an exposure-control device for use in a field-sequential color video camera.

In recent years, such field-sequential color video cameras have been applied to medical instruments, particularly to endoscopes. A video camera applied to an endoscope picks up the image of an object by means of a solid-state image sensor, such as a charge-coupled device (CCD) incorporated at the distal end of the endoscope. The output signals from the CCD are transmitted via signal lines in the endoscope to an external monitor or a display device, where they are displayed. This type of endoscope adopts a field-sequential system as a color image pick-up or camera system, since it performs dedicated illumination for observing dark objects such as the interior of body cavities and of fine tube members, and has a CCD incorporated in the narrow area of its distal end.

The construction and operation of this field-sequential system will be briefly explained below.

A rotary filter is provided at the front surface of a light source lamp which provides incident illumination for the light-guide fiber of the endoscope. The rotary filter serves to color the illumination light, sucessively red (R), green (G), and blue (B), with a light-blanking period occurring between each illumination period. The rotary filter makes one rotation during each field period of the standard television system, and as it does so, the illumination light is sequentially colored R, G, and B. The image signals corresponding to the respective color components of R, G, and B are superposed to be synthesized to form the full-color image signal of one field. Namely, the three color component fields picked up by the CCD are displayed as one field.

Generally, the color filter components corresponding to the respective colors of the rotary filter are not arranged successively, but are separated by portions which shade the illumination light. Thus, the image information corresponding to each individual color component is stored in the CCD during the illumination or coloring period associated with that particular color, and thereafter is read out during the subsequent light-shading period. The amount of incident illumination light emitted by the light-source lamp to the light-guide fiber is automatically adjusted, by means of a diaphragm, in accordance with the brightness level of the object under examination, since in the body cavities, the reflection factor, and hence the level of brightness, vary greatly. The brightness level of the object is ascertained by integrating the image signal provided by the CCD over a one-frame pick-up period.

Although the aforementioned field-sequential color video camera has been widely applied to a variety of medical instruments, it possesses the following defect:

In this camera, a one-field full-color signal consists of the color components of R, G, and B output from the CCD during the light-shading periods which occur between each associated illumination period. The image signal from the CCD is at zero-level during the illumination periods. Therefore, when the image signal from the CCD is integrated over a one-frame period, an integration capacitor, charged by the output image signal from the CCD, is discharged toward the CCD during these illumination periods. Thus, the light-adjust signal resulting from the integrated outputs will fluctuate during the image pick-up field period, thereby rendering proper diaphragm control impossible. Incidentally, this applies to not only the aforementioned electronic scope but also to general field-sequential color video cameras using an image pick-up tube. This phenomenon also occurs with a color mosaic filter type color video camera if the brightness of one frame image is determined by integrating two fields of image signals, since the blanking period seems to be the same as the illumination period.

SUMMARY OF THE INVENTION

An object of the present invention is to provide an exposure-control device for use in a video camera, which can, when the image signal intermittently output from an image pick-up or camera device is integrated in order to ascertaion the brightness level of an object under examination, provide the correct brightness level thereof, by preventing an integrating device from being discharged during the periods when the image signal is not output from the camera device, thereby preventing the integration value from being reduced.

To attain this object, in accordance with the present invention, there is provided an exposure-control device for use in a video camera, comprising an integration device for integrating the image signal intermittently output from a camera device; a gate device; connected to an input terminal of the integration device, for electrically separating the integration device from the camera device, by being made non-conductive during the periods when the image signal is not output; and a device for controlling the exposure in accordance with the outputs from the integration device.

In accordance with the exposure-control device for use in a video camera according to the present invention, since the integration device for the image signal is electrically separated from the camera device during the periods when an image signal is not output from the camera, it is possible to prevent the integration value in the integration device from being reduced during those periods because of the discharge of the integration device toward the camera device.

The above and other objects, features, and advantages of the present invention will be more clearly understood from the following detailed description, taken in conjunction with the accompanying drawings.

BRIEF DESCRIPTION OF THE DRAWINGS

FIGS. 4A to 4G are timing charts for explaining the operation of the electronic scope shown in FIG. 1.

DESCRIPTION OF THE PREFERRED EMBODIMENT

Figure 1:
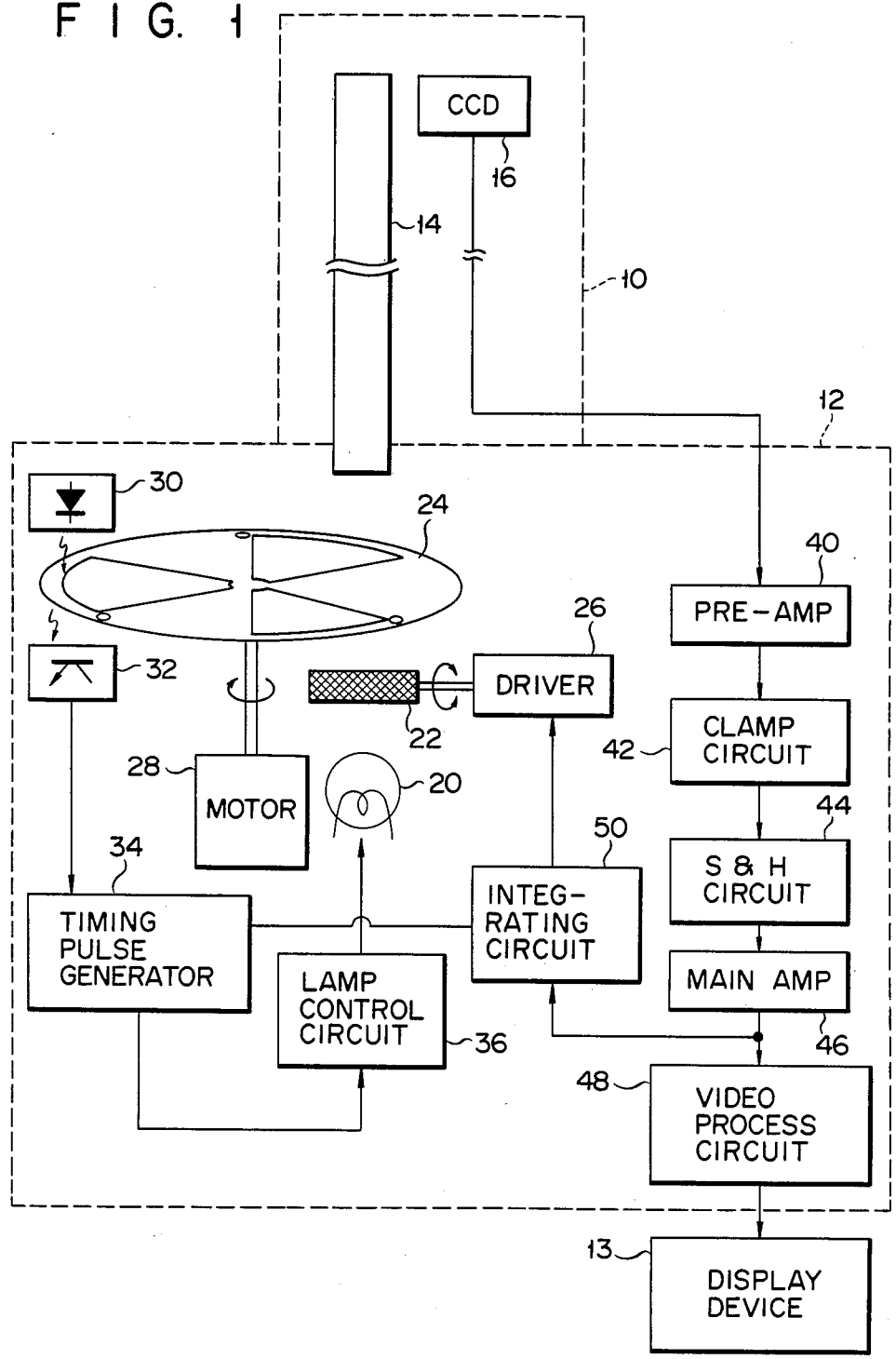
FIG. 1 is a block diagram of an electronic scope which is an exposure-control device for a video camera according to one embodiment of this invention.

Referring now to the drawings, one embodiment of this invention will be explained.

FIG. 1 shows an electronic scope, as mentioned above, which is one embodiment of the present invention. In FIG. 1, the electronic scope comprises an endoscope body 10, a signal-processing circuit 12, and a display device 13.

The endoscope body 10 is provided with a light-guide fiber 14 and a charge-coupled device (CCD) 16 used as a solid-state image sensor. Light-guide fiber 14 transmits illumination light from a light-source lamp 20, included in signal-processing circuit 12, to a distal end of the endoscope body 10, to illuminate an object under examination; the object being examined by means of the medical scope is the interior of a body cavity, which is dark. The CCD is incorporated at the distal end of endoscope body 10.

Signal-processing circuit 12 carries out both the function of a light source and that of video-processing the outputs from the CCD 16.

First, the light-source function thereof will be explained. The light from lamp 20, for example, a xenon lamp, is incident on one end of light-guide fiber 14, located in endoscope body 10, via a relay lens (not shown). A diaphragm plate 22 made of a honeycomb plate and a color-separation filter 24 of a rotary disk are inserted between lamp 20 and the one end of light-guide fiber 14. Diaphragm plate 22 intersects the travelling path of the light, and its intersection angle is varied by a driver 26. When diaphragm plate 22 intersects the light-travelling path, at right angles thereto, light transmittance is at its highest. When the intersection angles varies, the light transmittance is reduced in accordance with (the tangent component of the intersection angle)×(the thickness of the diaphragm plate 22). The diaphragm plate may be a slit plate instead of a honeycomb plate. Color-separation filter 24, whose main body is an opaque disk, is provided with three filter components, each of which is located within an approximately 120° segment of the disk, and which transmits only the color component lights of R, G, and B, respectively. Each filter component ranges over about 60°, and thus a light-shading period of about 60° occurs between the respective filter components. Color-separation filter 24 is rotated, by a motor 28, at a speed in synchronism with one field period of the standard television system, i.e. at a rate of one rotation every 1/60 sec. Thus, the illumination light which is incident on light-guide fiber 14 is successively colored R, G, and B, for every field, during the respective coloring periods, which occur between each of the associated light-shading periods. Color-separation filter 24 is provided with openings located at the respective trailing edges of the filter components, in relation to their direction of rotation. To detect these openings, a photo-coupler consisting of an LED (light-emitting diode) 30 and a phototransistor 32 are arranged around color-separation filter 24. The outputs from phototransistor 32 are supplied to a timing-pulse generator 34. Timing-pulse generator 34 supplies timing pulses to a lamp-control circuit 36, to control the light emission from the lamp, in synchronism with the rotation of color-separation filter 24, so that lamp 20 emits light only during the light-coloring periods, i.e., not during the light-shading periods.

Next, the video-processing function of signal-processing circuit 12 will be explained.

Since the illumination light is colored, as is mentioned above, by the rotation of color-separation filter 24, the image signals corresponding to the respective color components of R, G, and B are successively output from CCD 16, between each of the predetermined illumination periods (i.e. intermittently). The image signals thus output are supplied, for every field, to a main amplifier 46, via a preamplifier 40, a clamp circuit 42, and a sample-and-hold circuit 44, in that order. Clamp circuit 42 clamps the image signal, at a predetermined level, in synchronism with synchronization signals. Sample-and-hold circuit 44 samples and holds the intermittent image signal output from CCD 16, in synchronism with the driving thereof. The outputs from main amplifier 46 are supplied to an integrating circuit 50 and to a video-processing circuit 48. Integrating circuit 50 is also supplied with the timing pulses from timing-pulse generator 34. Video-processing circuit 48, having three field memories, superposes three color-component field images of R, G, and B, to thereby provide one full-color field image. The full-color image signal of one field is then transmitted to a display or monitor device 13. Incidentally, the driving pulses (not shown) are supplied to CCD 16, in synchronism with the outputs from timing pulse generator 34. The outputs from generator 34 are also supplied to clamp circuit 42 and sample-and-hold circuit 44, to provide the timings for the processing performed therein.

Figure 2:
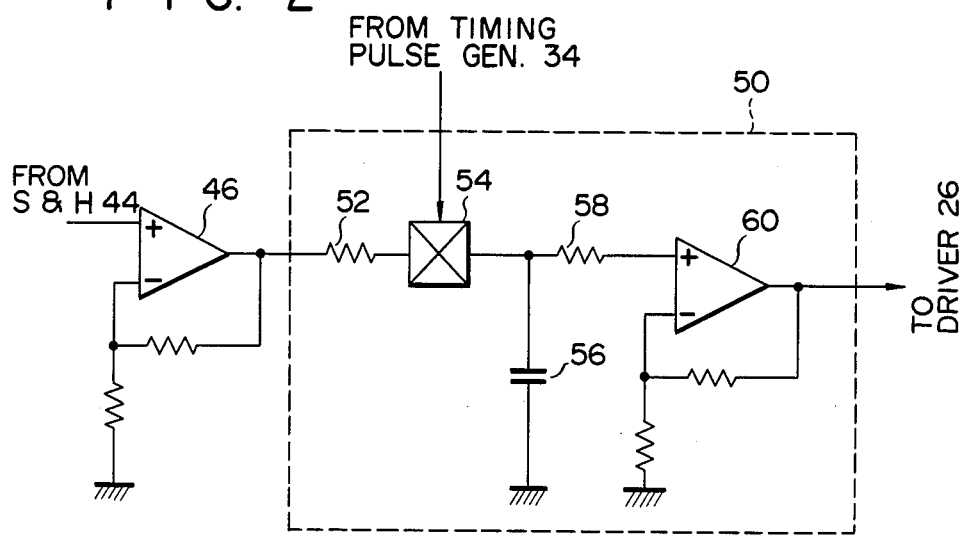
FIG. 2 is a circuit diagram of the integrating circuit shown in FIG. 1.

Referring now to FIG. 2, the circuit construction of integrating circuit 50 will be explained in detail.

In FIG. 2, the output signals from main amplifier 46 are supplied to one end of an integrating capacitor 56, via a resistor 52 and an analog switch or gate 54. The other end of integrating capacitor 56 is grounded; resistor 52 and integrating capacitor 56 constitute an integrator. The above-mentioned one end of integrating capacitor 56 is further connected to an amplifier 60, via a resistor 58; amplifier 60 is constituted by an amplifier having a high input impedance. The output from amplifier 60 is supplied, as the light-adjust signal, to a diaphragm driver 26.

Figure 3:
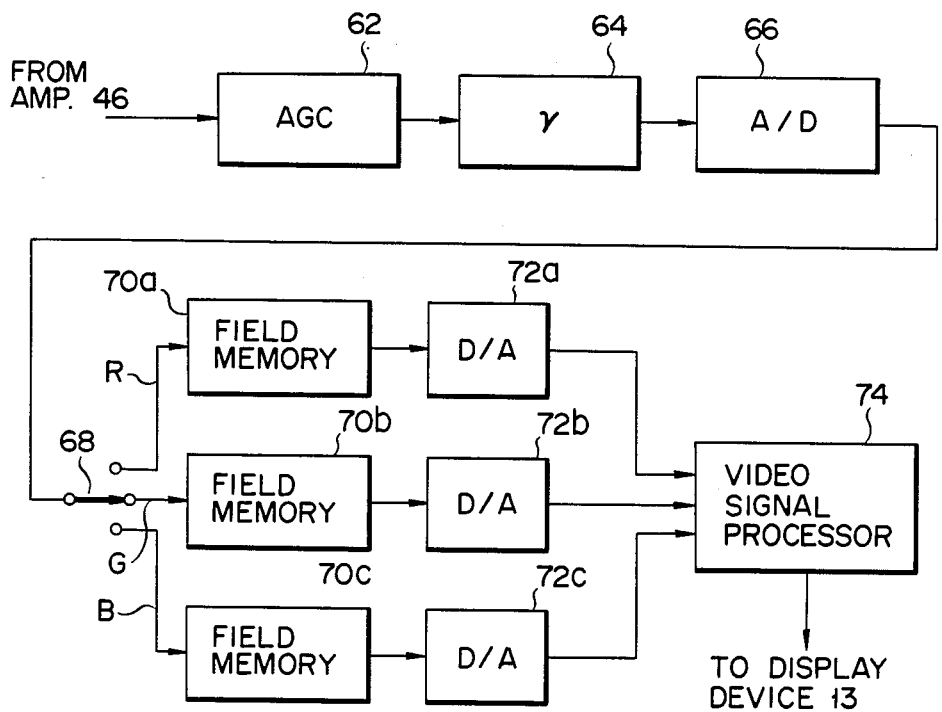
FIG. 3 is a block diagram of the video-processing circuit shown in FIG. 1.

The circuit construction of video processing circuit 48 is shown in detail in FIG. 3. In FIG. 3, the output from main amplifier 46 is supplied to an automatic gain control (AGC) circuit 62. The output signal from AGC circuit 62 is supplied to a selector 68, via a gamma (γ) correction circuit 64, for collecting the gamma characteristic, and an A/D converter 66. Selector 68 has three output terminals connected to field memories 70a, 70b, and 70c, respectively. The outputs from the field memories 70a, 70b, and 70c are supplied to a video signal-processor circuit 74, via D/A converters 72a, 72b, and 72c, respectively. The output from video signal-processor circuit 74 is supplied to display or monitor device 13.

Now, referring to the timing charts of FIGS. 4A to 4G, the operation of the circuit of FIG. 1 will be explained.

FIG. 4A shows synchronization (sync.) pulses which are generated from phototransistor 32 when the openings provided in color-separation filter 24 are detected by the photocoupler, as filter 24 rotates.

FIG. 4B shows how color-separation filter 24 performs filtering. As can be seen from FIGS. 4A and 4B, each of the sync. pulses is generated at the time of termination of the filtering period for each color. Timing-pulse generator 34 generates timing pulses in accordance with the sync. pulses. As is shown in FIG. 4C, lamp-control circuit 36 supplies, in accordance with the timing pulses, from generator 34, lamp currents to lamp 20, in synchronism with the filtering performed by color-separation filter 24. FIG. 4D shows the output signals, from the CCD 16, which will be input to integrating circuit 50. The image information of each of the color components of R, G, and B is stored in CCD 16 during each illumination period of R, G, and B. The output signals are at zero-level during these illumination periods. During the subsequent light-shading periods, the image signals associated with the respective color components of R, G, and B are output and supplied to integrating circuit 50. Timing-pulse generator 34 supplies, to analog gate 54 of integrating circuit 50, gate pulses whose phases are the opposite of those of the lamp currents. Analog gate 54 is made conductive when the gate pulse is at a high level, whereas it is made nonconductive when the gate is at a low level. Namely, analog gate 54 is made conductive while the lamp 20 is not emitting light, i.e., the image signal from CCD 16 is output; on the other hand, gate 54 is made nonconductive while the lamp 20 is emitting light, i.e., the image signal from CCD 16 is at zero level. Therefore, the output signal from CCD 16 is stored or charged in the integrating capacitor 56 via the analog gate 54, only during the period when the output signal is not at zero level. Since analog gate 54 is made nonconductive during the period the output signal from CCD 16 is at zero level, integrating capacitor 56 is electrically separated from integrating resistor 52, and the charged voltage or integrating value is held as shown in FIG. 4F. Further, the charged voltage is not discharged through amplifier 60, since amplifier 60 has a high input impedance. Incidentally, if analog gate 54 is not provided, the voltage charged in integrating capacitor 56, while the lamp is not emitting light, is charged while the lamp is emitting light, as can be seen from FIG. 4G.

As has been explained above, in accordance with this embodiment, integrating capacitor 56 is electrically separated from integrating resistor 52 during the period when any signal is not being output from CCD 16. This means that the charged voltage is never discharged through resistor 52. Therefore, the charged voltage used as the light-adjust signal does not fluctuate during a field period, thereby permitting stabilized diaphragm control to be accomplished.

It should be understood by those skilled in the art that the present invention is not limited to the above embodiment, but that various changes and modifications may be made in the invention without departing from the spirit and scope thereof.

For example, the inventive exposure-control device may be applied to typical field-sequential color video cameras, as well as the aforementioned electronic scope. Exposure control may also be performed by controlling the lamp current, without using the diaphragm, so as to directly control the amount of the light emitted from the lamp. Moreover, even if the diaphragm is used, such a diaphragm, serving to vary the amount of the light incident on an image sensor (CCD), may be provided on the front surface of CCD 16.

Several modifications of the integrating circuit may be made. Further, this invention can also be applied to color mosaic filter type color video cameras if the integration value associated with two fields is obtained. In this case, the integrating capacitor will be separated from the CCD during the vertical blanking period.

What is claimed is:

1. An exposure-control device for use in a video camera which sequentially and intermittently outputs color component signals (R,G,B), comprising:
   integration means having an input terminal and an output terminal, for serially and sequentially integrating the color component signals output from the video camera;
   single gate means switchable between a conductive state and a non-conductive state and connected between the video camera and the input terminal of said integration means, for electrically separating said integration means from said video camera and for serially and sequentially passing said color component signals (R,G,B) to said integration means;
   means coupled to said single gate means for placing said single gate means in said non-conductive state during a period when the color component signals are not output from the video camera; and
   exposure-control means for controlling an exposure level of the video camera in accordance with the output from said integration means.

2. An exposure-control device according to claim 1, wherein:
   said integration means comprises a capacitor to which said color component signals are supplied via a resistor, and a high-input impedance amplifier connected between said capacitor and said exposure-control means, and
   said single gate means comprises an analog gate connected between said resistor and said capacitor.

3. An exposure-control device according to claim 1, wherein said exposure-control means comprises a diaphragm means.

4. An exposure-control device according to claim 3, wherein said exposure-control means comprises a source of light, and said diaphragm means is interposed between said source of light and a subject, said diaphragm means being arranged to intersect light emitted by said light source at different angles, a light transmittance of said diaphragm means being a function of an angle of intersection of said diaphragm means with said light.

5. An exposure-control device for use in a video camera means, comprising:
   field-sequential video camera means for sequentially and intermittently outputting field image signals which include color component signals (R, G, B);
   integration means having an input terminal and an output terminal, for serially and sequentially integrating the color component signals output from said video camera means over a one-frame period;
   single gate means switchable between a conductive state and a non-conductive state and connected between the video camera means and the input terminal of said integration means, for electrically separating said integration means from said video camera means and for serially and sequentially passing said color component signals (R,G,B) to said integration means;
   means coupled to said single gate means for placing said signal gate means in said non-conductive state during a period when the color component signals are not output from said video camera means; and
   exposure-control means for controlling an exposure level of said video camera means in accordance with the output from said integration means.

6. An exposure-control device according to claim 5, wherein said video camera means comprises:
   filter means of a number of different colors for sequentially coloring an illumination light in the different colors during illumination period associated with each of the different colors, said illumination periods occurring between light-shading periods;
   a camera section means for picking up an object illuminated by the illumination light as colored in the respective colors by said filter means, during the illumination periods, and outputting the field image signals associated with the respective colors, during the light-shading periods; and signal-processing circuit means for generating a full-color signal, by adding together the field image signals associated with said different colors, respectively;

said integration means comprises means for integrating the field image signals associated with said different colors; and said exposure-control means comprises a diaphragm means for adjusting a level of the illumination light.

7. An exposure-control device according to claim 5, wherein:

said integration means comprises a capacitor to which said color component signals are supplied via a resistor, and a high-input impedance amplifier connected between said capacitor and said exposure-control means; and said single gate means comprises an analog gate connected between said resistor and said capacitor.

8. An exposure-control device according to claim 6, wherein:

said filter means comprises a rotary disk having filtering components associated with said different colors, said filtering components being arranged between light-shading portions, and said integration means is controlled by timing pulses which are generated during respective filtering periods of the color components, in synchronism with rotation of said rotary disk.

9. An exposure-control device according to claim 3, wherein said exposure-control means comprises a diaphragm means.

10. An exposure-control device according to claim 9, wherein said exposure-control means comprises a source of light, and said diaphragm means is interposed between said source of light and a subject, said diaphragm means being arranged to intersect light emitted by said light source at different angles, a light transmittance of said diaphragm means being a function of an angle of intersection of said diaphragm means with said light.

* * * * *